United States Patent
Wakeford et al.

(10) Patent No.: US 9,901,818 B1
(45) Date of Patent: Feb. 27, 2018

(54) SYSTEMS AND METHODS FOR REGULATING ACCESS TO GAME CONTENT OF AN ONLINE GAME

(71) Applicant: Aftershock Services, Inc., San Ramon, CA (US)

(72) Inventors: Kent Wakeford, Hillsborough, CA (US); Tomi Huttula, San Rafael, CA (US)

(73) Assignee: Aftershock Services, Inc., San Ramon, CA (US)

( * ) Notice: Subject to any disclaimer, the term of this patent is extended or adjusted under 35 U.S.C. 154(b) by 212 days.

(21) Appl. No.: 15/048,932

(22) Filed: Feb. 19, 2016

(51) Int. Cl.
- A63F 9/24 (2006.01)
- A63F 13/23 (2014.01)
- A63F 13/77 (2014.01)
- A63F 13/285 (2014.01)
- A63F 13/825 (2014.01)

(52) U.S. Cl.
CPC ............ *A63F 13/23* (2014.09); *A63F 13/285* (2014.09); *A63F 13/77* (2014.09); *A63F 13/825* (2014.09)

(58) Field of Classification Search
None
See application file for complete search history.

(56) References Cited

U.S. PATENT DOCUMENTS

| | | | |
|---|---|---|---|
| 5,331,353 A | 7/1994 | Levenson | |
| 6,527,641 B1 * | 3/2003 | Sinclair | A63F 13/12 455/456.1 |
| 6,722,984 B1 | 4/2004 | Sweeney | |
| 6,913,536 B2 | 7/2005 | Tomizawa | |
| 7,713,118 B2 | 5/2010 | Roemer | |
| 8,527,332 B2 | 9/2013 | Selby | |
| 8,814,691 B2 * | 8/2014 | Haddick | G02B 27/017 463/30 |
| 9,205,338 B1 | 12/2015 | Wakeford | |
| 2002/0090985 A1 | 7/2002 | Tochner | |
| 2002/0158917 A1 * | 10/2002 | Sinclair | A63F 13/12 715/850 |

(Continued)

OTHER PUBLICATIONS

The Queen's Wrath, URL: http://destiny.wikia.com/wiki/The_Queen's_Wrath [retrieved Jan. 22, 2016] 2 pgs.

(Continued)

*Primary Examiner* — Paul A D'Agostino
(74) *Attorney, Agent, or Firm* — Sheppard Mullin Richter & Hampton LLP

(57) ABSTRACT

Online games may include game content that may be played cooperatively by groups of users. The game content may include a group roles set for the users in individual groups. Users of an online game may interact with the online game via client computing platforms. The client computing platforms may include virtual reality platforms and non-virtual reality platforms. Access to the game content of the online game may be regulated by determining whether the users are attempting to play a game instance of the online game via the virtual reality platforms or the non-virtual reality platforms. A first set of group roles may be presented to users attempting to play the game instance via the virtual reality platforms. A second set of group roles may be presented to users attempting to play the game instance via the non-virtual reality platforms.

20 Claims, 4 Drawing Sheets

(56) References Cited

U.S. PATENT DOCUMENTS

| | | | |
|---|---|---|---|
| 2003/0119576 A1* | 6/2003 | McClintic | G07F 17/32 463/20 |
| 2003/0211889 A1* | 11/2003 | Walker | A63F 3/081 463/42 |
| 2005/0192097 A1 | 9/2005 | Farnham | |
| 2005/0282638 A1* | 12/2005 | Rowe | G07F 17/32 463/42 |
| 2006/0105838 A1* | 5/2006 | Mullen | A63F 13/211 463/31 |
| 2006/0287080 A1 | 12/2006 | Bychkov | |
| 2007/0013515 A1 | 1/2007 | Johnson | |
| 2007/0173323 A1* | 7/2007 | Johnson | A63F 13/12 463/42 |
| 2008/0300049 A1 | 12/2008 | Anderson | |
| 2008/0300055 A1* | 12/2008 | Lutnick | G06F 3/011 463/39 |
| 2009/0077463 A1* | 3/2009 | Koster | A63F 13/10 715/234 |
| 2009/0183226 A1 | 7/2009 | Dean | |
| 2009/0251457 A1 | 10/2009 | Walker | |
| 2010/0046553 A1 | 2/2010 | Daigle | |
| 2010/0056243 A1* | 3/2010 | Czyzewski | G07F 17/3244 463/16 |
| 2010/0093434 A1 | 4/2010 | Rivas | |
| 2010/0273557 A1 | 10/2010 | Miyaki | |
| 2011/0118022 A1 | 5/2011 | Aronzon | |
| 2011/0252079 A1* | 10/2011 | Werner | H04L 29/125 709/202 |
| 2011/0264246 A1 | 10/2011 | Pantoja | |
| 2011/0312423 A1 | 12/2011 | Mosites | |
| 2012/0127284 A1 | 5/2012 | Bar-Zeev | |
| 2012/0129598 A1* | 5/2012 | Chao | G07F 17/3237 463/31 |
| 2012/0172098 A1 | 7/2012 | Baker | |
| 2012/0244948 A1* | 9/2012 | Dhillon | G06Q 30/0209 463/42 |
| 2012/0244950 A1* | 9/2012 | Braun | G07F 17/3244 463/42 |
| 2012/0246301 A1* | 9/2012 | Vyrros | H04L 45/745 709/224 |
| 2012/0258802 A1 | 10/2012 | Weston | |
| 2012/0270623 A1* | 10/2012 | Walker | G07F 17/32 463/12 |
| 2012/0316999 A1 | 12/2012 | Koh | |
| 2012/0322545 A1 | 12/2012 | Arnone | |
| 2012/0329551 A1* | 12/2012 | Arezina | G07F 17/32 463/25 |
| 2013/0017870 A1* | 1/2013 | Parker | G06Q 30/02 463/1 |
| 2013/0045804 A1* | 2/2013 | Ruke | A63G 31/00 463/42 |
| 2013/0061260 A1 | 3/2013 | Maskatia | |
| 2013/0137522 A1* | 5/2013 | Kusano | G07F 17/3239 463/42 |
| 2013/0159519 A1* | 6/2013 | Hochberg | G06Q 50/01 709/225 |
| 2013/0184064 A1* | 7/2013 | Manning | G07F 17/3211 463/25 |
| 2013/0196757 A1* | 8/2013 | Latta | A63F 13/211 463/31 |
| 2013/0225305 A1 | 8/2013 | Yang | |
| 2014/0024445 A1 | 1/2014 | Aller | |
| 2014/0024464 A1* | 1/2014 | Belakovsky | A63F 13/60 463/43 |
| 2014/0028850 A1 | 1/2014 | Keating | |
| 2014/0066176 A1* | 3/2014 | Letourneau | A63F 13/60 463/23 |
| 2014/0094315 A1* | 4/2014 | Stine | A63F 13/12 463/42 |
| 2014/0113716 A1 | 4/2014 | Mukhopadhyay | |
| 2014/0121015 A1* | 5/2014 | Massing | G07F 17/3211 463/33 |
| 2014/0128161 A1* | 5/2014 | Latta | A63F 13/06 463/42 |
| 2014/0192084 A1 | 7/2014 | Latta | |
| 2014/0221084 A1* | 8/2014 | Morrison | H04L 67/32 463/29 |
| 2014/0258394 A1* | 9/2014 | Lucero | A63F 13/216 709/204 |
| 2014/0302915 A1* | 10/2014 | Lyons | G07F 17/3225 463/25 |
| 2014/0309002 A1 | 10/2014 | OGorman | |
| 2014/0370992 A1* | 12/2014 | Cudak | A63F 13/795 3/795 |
| 2014/0378214 A1* | 12/2014 | Suzuki | A63F 13/822 3/822 |
| 2015/0005052 A1 | 1/2015 | Harrington | |
| 2015/0011277 A1* | 1/2015 | Wakeford | A63F 13/00 463/1 |
| 2015/0080083 A1 | 3/2015 | Tamaoki | |
| 2015/0080127 A1 | 3/2015 | Tamaoki | |

OTHER PUBLICATIONS

Totilo, Assassin's Creed Unity Finally Drops App, Web Requirements for Unlocks [Update], Dated Feb. 18, 2015, 5pgs.

A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.

World of Warcraft Armory, URL: https://play.google.com/store/apps/details?id=com.blizzard.wow&hl=en [retrieved Jan. 20, 2016] 4pgs.

Companion App (iFruit)—GTA 5 Wiki Guide—IGN, URL http:www.ign.com/wikis/gta-5/Companion_App_(iFruit)) [retrieved Jan. 20, 2016] 17pgs.

The Free GTAV iFruit and Game Manual Companion Apps, URL: http://www.rockstargames.com/newswire/article/51371/the-free-gtav-ifruit-and-game-manual-companion-apps.html [retrieved on Jan. 20, 2016] 5 pgs.

FIFA 16—Companion App—EA Sports, URL: https://www.easports.com/fifa/features/companion-app [retrieved Jan. 22, 2016] 5pgs.

* cited by examiner

SYSTEMS AND METHODS FOR REGULATING ACCESS TO GAME CONTENT OF AN ONLINE GAME

FIELD OF THE DISCLOSURE

This disclosure relates to systems and methods for regulating access to game content of an online game.

BACKGROUND

Users may interact with online games via multiple platforms. Typically, online games are played via non-virtual reality platforms. Virtual reality platforms may provide a more immersive nature of gameplay. Providing multiplayer games with alliance between users playing the online game via non-virtual reality platforms and virtual reality platforms presents challenges because users playing via virtual reality platforms may have greater interactive potential than users playing via non-virtual reality platforms.

SUMMARY

One aspect of the disclosure relates to systems and methods for regulating access to game content of an online game. An online game may include game content that may be played cooperatively by groups of users. The game content may include a group roles set for the users in individual groups. The group roles set may include a first set of group roles, a second set of group roles, and/or other set(s) of group roles. Users of the online game may interact with the online game and/or each other via the users' client computing platforms. The client computing platforms may include virtual reality platforms and non-virtual reality platforms. Access to the game content of the online game may be regulated by executing a game instance of the online game and determining whether the users are attempting to play the game instance via the virtual reality platforms or the non-virtual reality platforms. The first set of group roles may be presented to users attempting to play the game instance via the virtual reality platforms. The second set of group roles may be presented to users attempting to play the game instance via the non-virtual reality platforms.

Regulating access to game content of an online game may be performed by one or more physical processors executing computer program components. In some implementations, the system may include one or more servers. The server(s) may be configured to communicate with one or more client computing platforms according to a client/server architecture. The users may access the system via client computing platform(s), for instance to engage in one or more games.

The physical processor(s) may be configured to execute one or more computer program components to regulate access to game content of an online game. The computer program components may include one or more of a game instance component, a platform component, a VR roles component, a non-VR roles component, and/or other components. It is noted that the client computing platforms may include one or more computer program components that are the same as or similar to the computer program components of the physical processor(s) to facilitate in game actions.

The game instance component may execute a game instance of the online game. The online game may include the game content that is played cooperatively by groups of users. The game content may include a group roles set for the users in individual groups. The group roles set may include a first set of group roles, a second set of group roles, and/or other set(s) of group roles. The first set of group roles may differ from the second set of group roles. In some implementations, the first set of group roles may be characterized by a first type of gameplay and the second set of group roles may be characterized by a second type of gameplay. The first type of gameplay may differ from the second type of gameplay.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

In some implementations, the virtual reality platforms may include one or more of a virtual reality headset display, a motion controller, a haptic generator, and/or other virtual reality platforms. In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

The platform component may determine whether the users of the online game are attempting to play the game instance via the virtual reality platforms or the non-virtual reality platforms. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively. In some implementations, the platform component may determine changes in the client computing platforms used by the users to interact with the online game.

The VR roles component may, responsive to determination that an individual user is attempting to play the game instance via one or more of the virtual reality platforms, effectuate presentation of the first set of group roles to such individual user. In some implementations, the VR roles component may, responsive to determination that an individual user changed from playing the online game via the one or more of the non-virtual reality platforms to the one or more of the virtual reality platforms, effectuate presentation of the first set of group roles to such individual user.

In some implementations, effectuating presentation of the first set of group of roles may include receiving selection of a group role from the first set of group roles by the users attempting to play the game instance via one or more of the virtual reality platforms. In some implementations, effectuating presentation of the first set of group of roles may include selecting a group role from the first set of group roles for the users attempting to play the game instance via one or more of the virtual reality platforms. The selected group roles may be implemented for the users attempting to play the game instance via one or more of the virtual reality platforms.

The non-VR roles component may, responsive to determination that an individual user is attempting to play the game instance via one or more of the non-virtual reality platforms, effectuate presentation of the second set of group roles to such individual user. In some implementations, the non-VR roles component may, responsive to determination that an individual user changed from playing the online game via the one or more of the virtual reality platforms to the one or more of the non-virtual reality platforms, effectuate presentation of the second set of group roles to such individual user.

In some implementations, effectuating presentation of the second set of group of roles may include receiving selection of a group role from the second set of group roles by the users attempting to play the game instance via one or more of the non-virtual reality platforms. In some implementations, effectuating presentation of the second set of group of roles may include selecting a group role from the second set of group roles for the users attempting to play the game instance via one or more of the non-virtual reality platforms. The selected group roles may be implemented for the users attempting to play the game instance via one or more of the non-virtual reality platforms.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
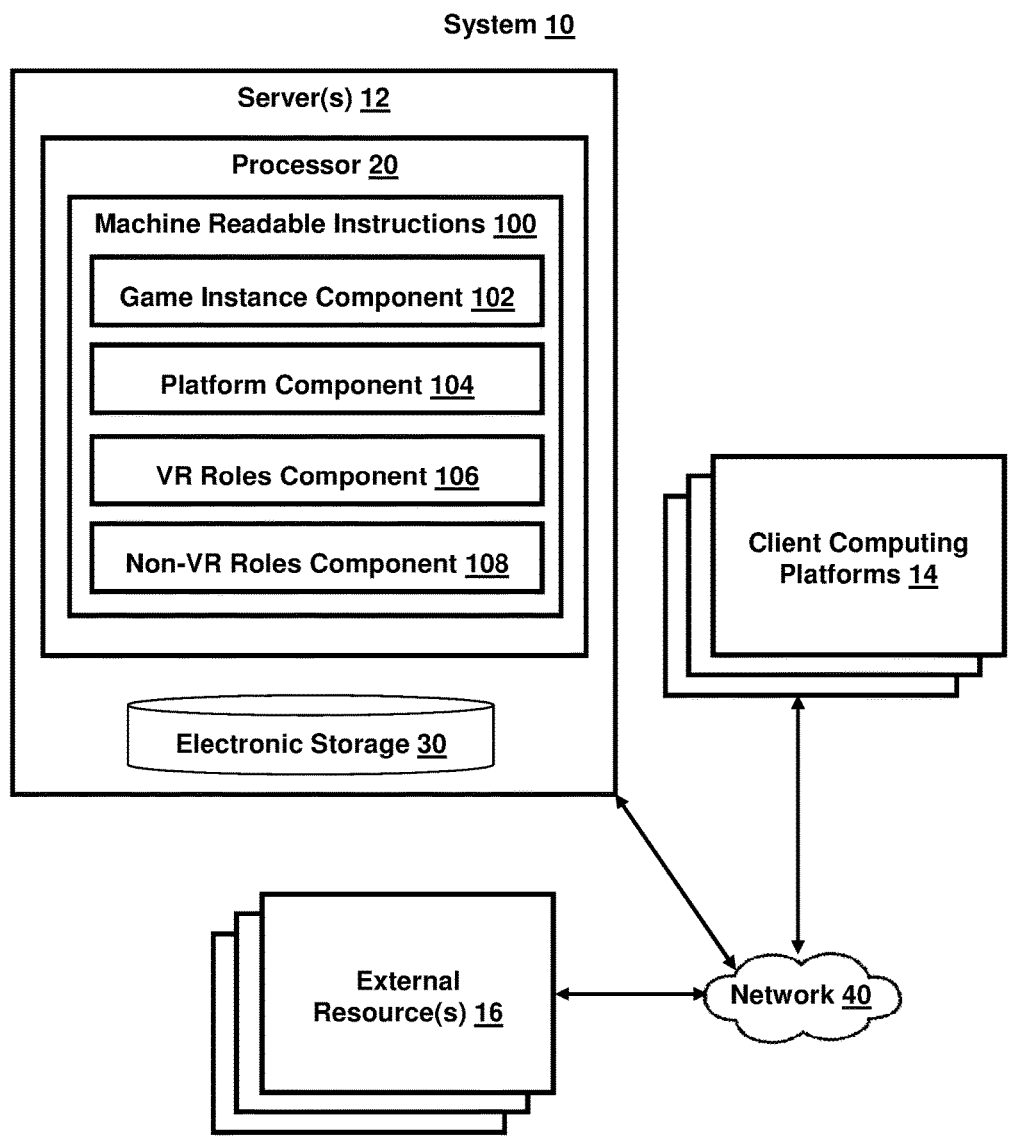
FIG. 1 illustrates a system for regulating access to game content of an online game.

FIG. 1 illustrates system 10 configured to regulate access to game content of an online game. The online game may be provided and/or executed by system 10. An online game may include game content that may be played cooperatively by groups of users. The game content may include a group roles set for the users in individual groups. The group roles set may include a first set of group roles, a second set of group roles, and/or other set(s) of group roles. Users of the online game may interact with the online game and/or each other via the users' client computing platforms. Client computing platforms 14 may include virtual reality platforms and/or non-virtual reality platforms. Access to the game content of the online game may be regulated by executing a game instance of the online game and determining whether the users are attempting to play the game instance via the virtual reality platforms or the non-virtual reality platforms. The first set of group roles may be presented to users attempting to play the game instance via the virtual reality platforms. The second set of group roles may be presented to users attempting to play the game instance via the non-virtual reality platforms.

Figure 3:
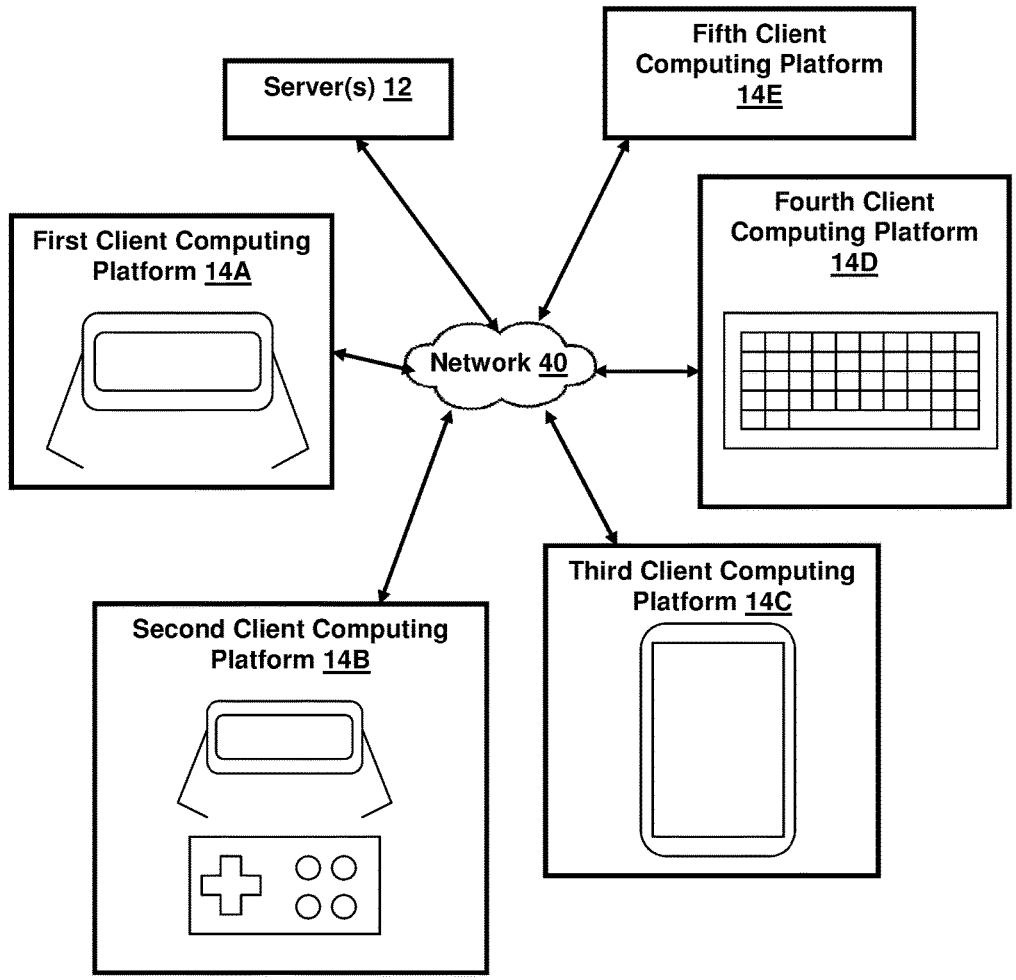
FIG. 3 illustrates exemplary connections between server(s) and client computing platforms.

Providing one or more of the online games may include hosting the online games over a network. In some implementations, as shown in this example, system 10 may include one or more servers 12 configured for hosting online games. Users may access system 10, the online game, and/or a game instance of the online game via client computing platforms 14, such as client computing platforms 14A-E as shown in FIG. 3.

Referring to FIG. 1, system 10 may include one or more of server(s) 12, client computing platforms 14, external resource(s) 16, processor 20, electronic storage 30, network 40, and/or other components. Server(s) 12, client computing platforms 14, external resource(s) 16, and/or other components may be connected via network 40.

Client computing platforms 14 may include virtual reality platforms and/or non-virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

External resource(s) 16 may include sources of information, hosts and/or providers of virtual environments outside of system 10, external entities participating with system 10, and/or other resources.

Server(s) 12 may include electronic storage 30. Electronic storage 30 may include electronic storage media that electronically stores information. Electronic storage 30 may store software algorithms, information determined by processor 20, information received remotely, information received from server(s) 12, information received from client computing platforms 14, and/or other information that enables system 10 and/or server(s) 12 to function properly.

For example, electronic storage 30 may store information relating to an online game, information relating to a game instance of an online game, information relating to virtual reality platforms and non-virtual reality platforms, information relating to group roles, information relating to one or more computer components, and/or other information.

Server(s) 12 may be configured to communicate with one or more client computing platforms 14 according to a client/server architecture, and with each other. Server(s) 12 may include processor 20 configured to execute one or more machine readable instructions 100. Machine readable instructions 100 may include one or more computer program components. The computer program components may include one or more of game instance component 102, platform component 104, VR roles component 106, non-VR roles component, 108, and/or other components. In some implementations, client computing platforms 14 may include one or more computer program components that are the same as or similar to the computer program components of physical processor 20 to facilitate in game actions.

Game instance component 102 may be configured to execute a game instance of the online game. The online game may include the game content that is played cooperatively by groups of users. For example, a game content may be played cooperatively by one or more groups of users against entities controlled by game instance component 102 (Player vs. Environment content). As another example, a game content may be played cooperatively between group(s) of users against other group(s) of users (Player vs. Player content). As another example, a game content may be played cooperatively between group(s) of users against other group(s) of users and against entities controlled by game instance component 102 (Hybrid content).

A group of users may refer to one or more users associated together in an online game. A group of users may associate together as a loose collection of users that work together to progress through a game session. A game session may include a beginning, a middle, an end, and/or other portions. A game instance may include one or more game sessions. One or more users of a group may be associated together based on one or more common objectives in the online game/game session. For example, a group of users may include an affiliation (e.g., alliance, guild, team, party, etc.) in an online game and a common objective in the online game may include defeating enemies of the affiliation (e.g., non-player entities or enemies controlled by users not in the alliance/guild/team/party, etc.), reaching a certain point in the online game, and/or other common objectives.

A group of users may be inclusive or exclusive of other groups. For example, users belonging in one group may be prohibited from joining another group (e.g., in an online battle game between groups A and B, users in group A may be prohibited from joining group B and vice versa, etc.). As another example, users belonging in one group may be allowed to join another group (e.g., in an online racing game between factions C and D, faction C may include multiple groups and users in one group of faction C may join another group of faction C, etc.).

A group of users may be temporary or persistent. A temporary group may refer to an affiliation of users that may exist for a single game session or a single game instance (which may include one or more game sessions). For example, users in a game session may be randomly assigned to different teams. When the game session is over, the users' assignments to the teams may be cleared and the users may again be randomly assigned to different teams. As another example, users in a game instance may join different teams. The team assignment for a user may be maintained (unless changed by the user) across multiple game sessions of the game instance. The team assignment for the user may be cleared when the user leaves the game instance.

A persistent group may refer to an affiliation of users that crosses over multiple game instances. For example, a user may be assigned to a team while playing in a cooperative gameplay. After the cooperative gameplay, the user may switch to an individual gameplay. When the user returns to the cooperative gameplay, the user's assignment to the team may be maintained and the user may cooperatively play the online game with the same team. As another example, a user may join a team during a game instance and leave the game instance. When the user joins another game instance, the user's team assignment may be maintained.

Users in a group may play the online game by taking on one or more group roles. A group role may refer to one or more parts and/or functions in the online game that assist other part(s) and/or function(s) in the same group. A group role may be static or dynamic. For example, a group role may include the same part(s) and/or function(s) in the online game regardless of the time(s) of play and/or the state(s) of the online game. As another example, a group role may include different part(s) and/or function(s) in the online game based on the time(s) of play and/or the state(s) of the online game. A group role may allow a user to take one or more actions in the online game to progress in the game and/or cooperate with other users in the group. Of possible actions that may be available in the online game, different sets of options may be made available to different group roles.

For example, an online game may include a group role of a group member, a group role of a group leader, and/or other group roles. A user playing the role of a group leader may be provided with additional options in the online game not available to a user playing the role of a group member. Additional options available to a group leader may be made available during a play portion of the online game (e.g., racing portion of a racing game, etc.) and/or during a non-play portion of the online game (e.g., one or more portions of a racing game used to determine racing tracks, weather conditions, cars available, assignment of specific cars to specific group member, inviting and/or accepting users to a group, etc.). For example, during a play portion of the online game, a group leader may be provided with additional options of assigning task(s) to group members, and/or other options. As another example, during a non-play portion of the online game, a group leader may be provided with additional options of adding/removing users from the group, and/or other options. As another example, a group leader may be provided with additional and/or different interfaces within the online game than a group member. Additional and/or different interfaces may allow a group leader to perform one or more additional options.

A group roles set may refer to one or more group roles available for an individual group. A group roles set for one group may include the same or different group roles as a group roles set for another group. For example, in an online space fighter game between group A and group B, a group roles set for group A and group B may both include a group role of a pilot and a group role of a navigator. As another example, in an online fantasy game between group C and group D, group C may include group role of a knight and a group role of a priest, and group D may include group role of a troll and a group role of a dragon. Other types of group roles are contemplated.

A game content may include one or more group roles set for the users in individual groups. Group roles in individual group roles sets may be played cooperatively with each other and/or may complement each other. Interaction with the game instance by one group role in a group roles set may assist another group role in the group roles set. For example, for an individual group, one group role in a group role set may include a group role of a fighter and another group role in the group role set may include a group role of a healer. A fighter may assist a healer by providing combat support in fight against enemies. A healer may assist a fighter by providing healing support. Other types of cooperation between group roles are contemplated.

A group roles set may include different sets of group roles. For example, a group roles set may include a first set of group roles, a second set of group roles, and/or other set(s) of group roles. The first set of group roles may differ from the second set of group roles. The first set of group roles and the second set of group roles may include different capabilities of interacting with the online game. For example, the first set of group roles may include higher capabilities of interacting with the online game than the second set of group roles.

Higher capabilities of interacting with the online game may provide greater potential for game experience based on one or more of sight, touch, hearing, smell, and/or other sensory experience. Higher capabilities of interacting with the online game may include additional and/or increased motion inputs, views, visibility, feedback and/or other interactions a user may have with the online game. For example, the first set of group roles may include additional and/or increased motion inputs that allow the users to provide input through one or more motions and/or gestures (e.g., waving a hand/motion controller in a particular manner to provide input associated with a combat movement, moving a head to change the direction of view, etc.). As another example, the first set of group roles may include additional and/or increased feedback (e.g., a hit is registered with one or more vibrations and/or temperature, etc.). Other types of interactive capabilities are contemplated.

In some implementations, the first set of group roles may be characterized by a first type of gameplay and the second set of group roles may be characterized by a second type of gameplay. A gameplay may refer to a manner in which users interact with the online game. A gameplay may define one or more of views of the online game, options available to users to interact with the online game and/or each other, inputs into the online game available to users, outputs out of the online game available to users, and/or other manner in which users may interact with the online game. For example, types of gameplays may include role-playing, first-person shooter, third-person action, real-time strategy, turn-based strategy, simulation, music or rhythm playing, social interaction, twitching and/or any other gameplays.

The first type of gameplay may differ from the second type of gameplay. For example, the first set of group roles may be characterize by a first-person battle type of gameplay and the second set of group roles may be characterized by a resource gathering type of gameplay. A battle type of gameplay may include users using virtual reality platforms to fight against enemies from a first-person view (e.g., view of the game instance may be generated from the position of the users' avatars, and the users may use physical motions to change the direction of view, to duck, to jump, to strike, to defend, etc. within the online game) A resource gathering type of gameplay may include users using non-virtual reality platforms to gather resources (e.g., view of the game instance may be generated above the position of the user's avatars (e.g., top-down view, etc.), and the users may use controllers (e.g., game controller, keyboard, mouse, touch screen, etc.) to command gathering of resources, etc.). Other types of gameplays are contemplated.

The game instance of the online game may comprise a simulated virtual space, e.g., a virtual space that is accessible by users via clients (e.g., client computing platforms 14) that present the views of the virtual space to a user. The virtual space may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual space associated with the online game as determined by game instance component 102 is not intended to be limiting. Game instance component 102 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Game instance component 102 may be configured to use the game instance to generate game state information that is transmitted to client computing platforms 14 over network 40. The execution of the instance of the online game by game instance component 102 may include determining a game state associated with the online game. The game state information may facilitate presentation of views of the online game to the users via client computing platforms 14. The game state information may include information defining the virtual space in which the online game is played.

Game instance component 102 may be configured to transmit the game state information over network 40 to the client computing platforms 14, causing client computing platforms 14 to present views of the online game. The game state information may be communicated (e.g., via streaming visual data, via object/position data, and/or other state information) from server(s) 12 to client computing platforms 14 for presentation to users.

The game state information determined and transmitted to a given client computing platform 14 may correspond to a view for a user character being controlled by a user via the given client computing platform 104. The state determined and transmitted to a given client computing platform 104 may correspond to a location in a virtual space associated with the online game. The view described by the game state information for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Views of the online game presented via a virtual reality platform may include views presented on a virtual reality headset display (e.g., a head-mounted display device, etc.). The views may be presented stereoscopically—one for each eye—via the virtual reality headset display and the user's brain may combine them to create a three-dimensional experience. The virtual reality headset display may include a head tracking system that tracks movement (e.g., position, orientation, change in position, change in orientation, etc.) of the users as they move their heads and/or move around the environment. The virtual reality headset display may include a sensor system (e.g., image sensor system, distance sensor system, etc.) that track movement of the users' body parts (e.g., user's hands, arms, feet, legs, etc.) and/or objects (e.g., glove, wand, controller, markers, etc.). Views of the online game presented via a non-virtual reality platform may include views presented on a display for one or more of a mobile device (e.g., a smart phone, tablet, laptop, etc.), desktop computer, gaming console, televisions, and/or other non-virtual reality platforms.

The execution of the game instance may enable interaction by the users with the online game and/or each other. Game instance component 102 may be configured to perform operations in the game instance in response to commands received over network 40 from client computing platforms 14. Within the instance of the online game, users may interact with elements in the online game and/or with each other through gameplays provided by the online game.

Users may participate in the online game through client game applications implemented on client computing platforms 14 associated with the users. Within the game instance of the online game executed by game instance component 102, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

The user controlled element(s) may move through and interact with the virtual space (e.g., user-virtual space units in the virtual space, non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Controls of virtual elements in the online game may be exercised through commands input by a given user through client computing platforms 14. The given user may interact with other users through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through game instance component 102).

Execution and/or performance of the user action by game instance component 102 may produce changes to the game state, which may reflect progresses and/or results of the user actions. In some examples, state changes caused by the execution of the user actions may be recorded in the electronic storage 30 to facilitate persistency throughout the instance of the online game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via a virtual reality platform, a given user may input a broad range of commands. The input commands via virtual reality platform may include the user performing the action as an input command. Based on the user's actions in the real world, the user may be able to look around, move about, and or otherwise act within the virtual space in which the online game is played.

The instance of the online game may comprise virtual entities automatically controlled in the instance of the online game. Such virtual entities may or may not be associated with any user. As such, the automatically controlled virtual entities may be generated and/or developed by artificial intelligence configured with server(s) 12 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with server(s) 12. As used herein, such automatically controlled virtual space entities in the instance of the online game are referred to as "non-player entities."

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

Platform component 104 may be configured to determine whether the users of the online game are attempting to play the game instance via the virtual reality platforms or the non-virtual reality platforms. Platform component 104 may obtain client computing platform information and identify client computing platforms 14 used to interact with the virtual space based on the client computing platform information. The client computing platform information may include information that identifies virtual reality capability of client computing platforms 14 (e.g., virtual reality vs. non-virtual reality, etc.), a class of client computing platforms 14, a particular type of client computing platform 14, and/or other information identifying client computing platforms 14.

Platform component 104 may include or retrieve information (for example, a database, etc.) that matches the client computing platform information to one or more virtual reality platforms or one or more non-virtual reality platforms. For example, a class of client computing platform may include general descriptions of client computing platforms such as information indicating that a client computing platform includes a virtual reality headset display, a motion controller, a game controller, a haptic generator, a speaker, a head-mounted display device, a desktop computing device, a laptop computing device, a tablet device, a mobile device (e.g., smart phone), and/or other general description regarding the client computing platforms used to interact with the virtual space. Platform component 104 may include or retrieve information that matches one or more information regarding the class of client computing platform to one or more virtual reality platforms or one or more non-virtual reality platforms.

As another example, a type of client computing platform may include specific descriptions of client computing platforms such as a particular brand, model, operating system, and/or other description that more specifically identifies the client computing platform 14 used to interact with the virtual space. Platform component 104 may include or retrieve information that matches one or more information regarding the type of client computing platform to one or more virtual reality platforms or one or more non-virtual reality platforms.

For example, FIG. 3 illustrates exemplary connections between server(s) 12 and client computing platforms 14. Server(s) 12 may execute a game instance of an online game and users may be attempting to play the game instance via computing platforms 14. Computing platforms 14 may include first client computing platform 14A (e.g., a virtual reality headset display, etc.), second client computing platform 14B (e.g., a head-mounted display and a game controller, etc.), third client computing platform 14C (e.g., a tablet device, etc.), fourth client computing platform 14D (e.g., a laptop computing device, etc.), fifth client computing platform 14E (e.g., other client computing platform(s)), and/or other client computing platforms.

Based on the client computing platform information, platform component 104 may determine that users of first client computing platform 14A and second client computing platform 14B are attempting to play the game instance via virtual reality platforms. Based on the client computing platform information, platform component 104 may determine that users of third client computing platform 14C and fourth client computing platform 14D are attempting to play the game instance via non-virtual reality platforms. Based on the client computing platform information, platform component 104 may determine whether the user of fifth client computing platform 14E is attempting to play the game instance via virtual reality platform or non-virtual reality platform.

Platform component 104 may obtain the client computing platform information passively or actively. Platform component 104 may passively obtain the client computing platform information based on communications with client computing platforms 14 such as by reading headers and/or other portions of communications from client computing platforms 14 to identify the client computing platforms being used to interact with the virtual space. For example, platform component 104 may read Hypertext Transfer Protocol ("HTTP") headers to determine a browser used to interact with the virtual space and accordingly identify the client computing platform that operates the browser. Agents used to interact with the virtual space other than a browser may be operating on client computing platform 14. Such agents may encode the client computing platform information and provide to server(s) 12 the client computing platform information.

Platform component 104 may actively obtain the client computing platform information such as by querying and/or otherwise causing client computing platforms 14 to provide the client computing platform information. For example, platform component 104 and/or an agent operating on client computing platforms 14 may cause a prompt for users to input the client computing platform information.

In some implementations, platform component 104 may be configured to determine changes in client computing platforms 14 used by the users to interact with the online game. Platform component 104 may determine when a given user changes the client computing platform 14 used to interact with the virtual space. For example, a user may change from using a laptop device to using a virtual reality headset display to interact with the virtual space. Platform component 104 may detect the change and accordingly associate the new client computing information with the user.

VR roles component 106 may, responsive to determination that an individual user is attempting to play the game instance via one or more of the virtual reality platforms, effectuate presentation of the first set of group roles to such individual user. Presentation of the first group of roles may be effectuated through provision of visual and/or audio information relating to the first set of group roles via the users' client computing platforms 14.

Visual information may refer to one or more information that may be observed visually. Visual information may be static or dynamic. For example, visual information relating to a set of group roles may include one or more of an image (e.g., an image showing the set of group roles, etc.), a text (e.g., a text listing the set of group roles, etc.), a video (e.g., a video showing the set of group roles, etc.) and/or other visual information conveying information regarding the set of group roles.

Audio information may refer to one or more information that may be observed audibly. Audio information may be static or dynamic. For example, audio information relating to a set of group roles may include one or more of a sound (e.g., a sound clip associated with the set of group roles, etc.), a music (e.g., a song associated with the first set of group roles, etc.), a word (e.g., a word associated with the set of group roles, etc.), a sentence (e.g., a sentence describing the set of group roles), and/or other audio information conveying information regarding the set of group roles.

In some implementations, VR roles component 106 may, responsive to determination that an individual user changed from playing the online game via the one or more of the non-virtual reality platforms to the one or more of the virtual reality platforms, effectuate presentation of the first set of group roles to such individual user.

In some implementations, effectuating presentation of the first set of group of roles may include receiving selection of a group role from the first set of group roles by the users attempting to play the game instance via one or more of the virtual reality platforms. The selected group roles may be implemented for the users attempting to play the game instance via one or more of the virtual reality platforms.

Users may select a group role from the first set of group roles via client computing platforms 14. For example, a user of first client computing platform 14A may select a group role by making a gesture or other movements observed by the virtual reality headset display. As another example, a user of second computing platform 14B may select a group role shown in the head-mounted display via operation of the game controller or by speaking a word/command associated with the group role. Other implementations of selecting the group role are contemplated.

In some implementations, effectuating presentation of the first set of group of roles may include selecting a group role from the first set of group roles for the users attempting to play the game instance via one or more of the virtual reality platforms. The selected group roles may be implemented for the users attempting to play the game instance via one or more of the virtual reality platforms.

VR roles component 106 may select a group role from the first set of group roles for a user. The selection may be based on input received from the user (e.g., input indicating the user's preference for play, etc.), information about the user (e.g., the user's amount of experience, level, currency, prior role(s), etc.), input received from another user (e.g., input from a team leader indicating the user's role, etc.) and/or other information relating to selection of the group role.

In some implementations, VR roles component 106 may exclude from the first set of group roles roles fulfilled by other users in the group. For example, the first set of group roles may include two roles for fighters and other roles. Before a user joins the online game, two other users in the same group may have already selected the two roles for fighters. The user may be presented with the first set of group roles excluding the two roles for fighters.

Non-VR roles component 108 may, responsive to determination that an individual user is attempting to play the game instance via one or more of the non-virtual reality platforms, effectuate presentation of the second set of group roles to such individual user. Presentation of the second group of roles may be effectuated through provision of visual and/or audio information relating to the second set of group roles via the users' client computing platforms 14.

In some implementations, non-VR roles component 108 may, responsive to determination that an individual user changed from playing the online game via the one or more of the virtual reality platforms to the one or more of the non-virtual reality platforms, effectuate presentation of the second set of group roles to such individual user.

In some implementations, effectuating presentation of the second set of group of roles may include receiving selection of a group role from the second set of group roles by the users attempting to play the game instance via one or more of the non-virtual reality platforms.

Users may select a group role from the second set of group roles via client computing platforms 14. For example, a user of third client computing platform 14C may select a group role by touching different portions of the tablet device. As another example, a user of fourth computing platform 14D may select a group role shown in a laptop computing device via operation of the laptop computing device (e.g., operation of a keyboard and/or mouse, etc.) to input associated with the group role. Other implementations of selecting the group role are contemplated.

In some implementations, effectuating presentation of the second set of group of roles may include selecting a group role from the second set of group roles for the users attempting to play the game instance via one or more of the non-virtual reality platforms. The selected group roles may be implemented for the users attempting to play the game instance via one or more of the non-virtual reality platforms.

In some implementations, the first set of group roles may be based on the users attempting to the play the game instance via one or more of the virtual reality platforms and other client computing platform information (e.g., class, type, etc.) for the client computing platforms 14. For example, the first set of group roles may be adjusted based on the class and/or type of the virtual reality platform. In some implementations, the second set of group roles may be based on the users attempting to the play the game instance via one or more of the non-virtual reality platforms and other client computing platform information (e.g., class, type, etc.) for the client computing platforms 14. For example, the second set of group roles may be adjusted based on the class and/or type of the non-virtual reality platform.

Figure 4:
FIGS. 4-5 illustrate exemplary data structures storing platform information and group role information.
Figure 5:

For example, FIGS. 4-5 illustrates exemplary data structures 400, 500 storing platform information for client computing platforms and group role information. The data representation of data structures 400, 500 illustrated herein are for illustrative purposes only. The data structures may take different forms and may store some or all of the illustrated data values (as well as others not illustrated). Data structures 400, 500 may be stored in electronic storage (e.g., electronic storage 30 illustrated in FIG. 1). Data structures 400, 500 and/or other data structures may be programmed into platform component 104, updated by platform component 104, obtained by platform component 104 from electronic storage 30, obtained by platform component 104 from remote location (e.g., a server, a network, etc.), and/or obtained by platform component 104 in other ways.

As illustrated, data structure 400 may store client computing platform information for various client computing platforms that may be used to interact with the online game. For example, data structure 400 may store various client computing platforms and their corresponding characteristics, which may indicate capabilities of the client computing platforms. For example, data structure 400 may store an identifier (which may be auto-incremented, not an actual identifier such as a MAC address), client computing platform information, and/or other information. Data structure 400 may match a certain identifier with certain client computing platform information.

For example, a virtual reality platform identified as "VR A" may correspond to client computing platform information for first client computing platform 14A (e.g., a virtual reality headset display, etc.). A virtual reality platform identified as "VR B" may correspond to second client computing platform 14B (e.g., a head-mounted display and a game controller, etc.). A non-virtual reality platform identified as "Non-VR A" may correspond to third client computing platform 14C (e.g., a tablet device, etc.). And a non-virtual reality platform identified as "Non-VR B" may correspond to fourth client computing platform 14D (e.g., a laptop computing device, etc.).

The virtual reality platform "VR A" may correspond to identifier 1. The virtual reality platform "VR B" may correspond to identifier 2. The non-virtual reality platform "Non-VR A" may correspond to identifier 3. And the non-virtual reality platform "Non-VR B" may correspond to identifier 4. In some implementations, one or more platforms may correspond to multiple identifiers. In some implementations, one or more identifiers may correspond to multiple platforms.

As illustrated, data structure 500 may store group role information for various client computing platforms that may be used to interact with the online game. Data structure 500 may include identifiers that correspond to one or more sets of group roles. For example, data structure 500 may include identifiers that correspond to one or more group roles for the first set of group roles and/or second set of group roles. "Group Role A" may correspond to identifiers 1 and 2. "Group Role B" may correspond to identifier 1. "Group Role C" may correspond to identifier 3. "Group Role D" may correspond to identifier 4.

Based on data structures 400 and 500, VR roles component 106 may effectuate presentation of the first set of group roles to users playing the online game via one or more of the virtual reality platforms. For example, VR roles component 106 may effectuate presentation of "Group Role A" to users of first client computing platform 14A and second client computing platform 14B. VR roles component 106 may also effectuate presentation of "Group Role B" to the user of first client computing platform 14A. Other uses of data structures to effectuate presentation of the first set of group roles to users playing the online game via one or more of the virtual reality platforms are contemplated.

Based on data structures 400 and 500, non-VR roles component 108 may effectuate presentation of the second set of group roles to users playing the online game via one or more of the non-virtual reality platforms. Non-VR roles component 108 may effectuate presentation of "Group Role C" to users of third client computing platform 14C and fourth client computing platform 14D. Non-VR roles component 108 may also effectuate presentation of "Group Role D" to the user of fourth client computing platform 14D. Other uses of data structures to effectuate presentation of the second set of group roles to users playing the online game via one or more of the non-virtual reality platforms are contemplated.

In some implementations, server(s) 12, client computing platforms 14, and/or external resource(s) 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platforms 14, and/or external resource(s) 16 may be operatively linked via some other communication media.

A given client computing platform 14 may include one or more processors configured to execute computer program components. The computer program components may be configured to enable a user associated with the given client computing platform 14 to interface with system 10 and/or external resource(s) 16, and/or provide other functionality attributed herein to client computing platforms 14.

Server(s) 12 may include electronic storage 30, one or more processors 20, and/or other components. Server(s) 12 may include communication lines, or ports to enable the exchange of information with a network and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Processor 20 may be configured to provide information processing capabilities in server(s) 12. As such, processor 20 may include one or more of a digital processor, a central processing unit, a graphics processing unit, a microcontroller, an analog processor, a digital circuit designed to process information, an analog circuit designed to process information, a state machine, and/or other mechanisms for electronically processing information.

Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination. Processor 20 may be configured to execute computer components 102, 104, 106, and/or 108. Processor 20 may be configured to execute computer components 102, 104, 106, and/or 108 by software; hardware; firmware; some combination of software, hardware, and/or firmware; and/or other mechanisms for configuring processing capabilities on processor 20.

It should be appreciated that although computer components 102, 104, 106, and 108 are illustrated in FIG. 1 as being co-located within a single processing unit, in implementations in which processor 20 includes multiple processing units, one or more of computer components 102, 104, 106, and/or 108 may be located remotely from the other components.

The description of the functionality provided by the different computer components 102, 104, 106, and 108 described herein is for illustrative purposes, and is not intended to be limiting, as any of computer components 102, 104, 106, and 108 may provide more or less functionality than is described. For example, one or more of computer components 102, 104, 106, and/or 108 may be eliminated, and some or all of its functionality may be provided by other computer components 102, 104, 106, and/or 108. As another example, processor 20 may be configured to execute one or more additional computer components that may perform some or all of the functionality attributed to one or more of computer components 102, 104, 106, and/or 108.

Electronic storage 30 may comprise electronic storage media that electronically stores information. The electronic storage media of electronic storage 30 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Although electronic storage 30 is shown in FIG. 1 as a single entity, this is for illustrative purposes only. In some implementations, electronic storage 30 may comprise a plurality of storage units. These storage units may be physically located within the same device, or electronic storage 30 may represent storage functionality of a plurality of devices operating in coordination.

Figure 2:
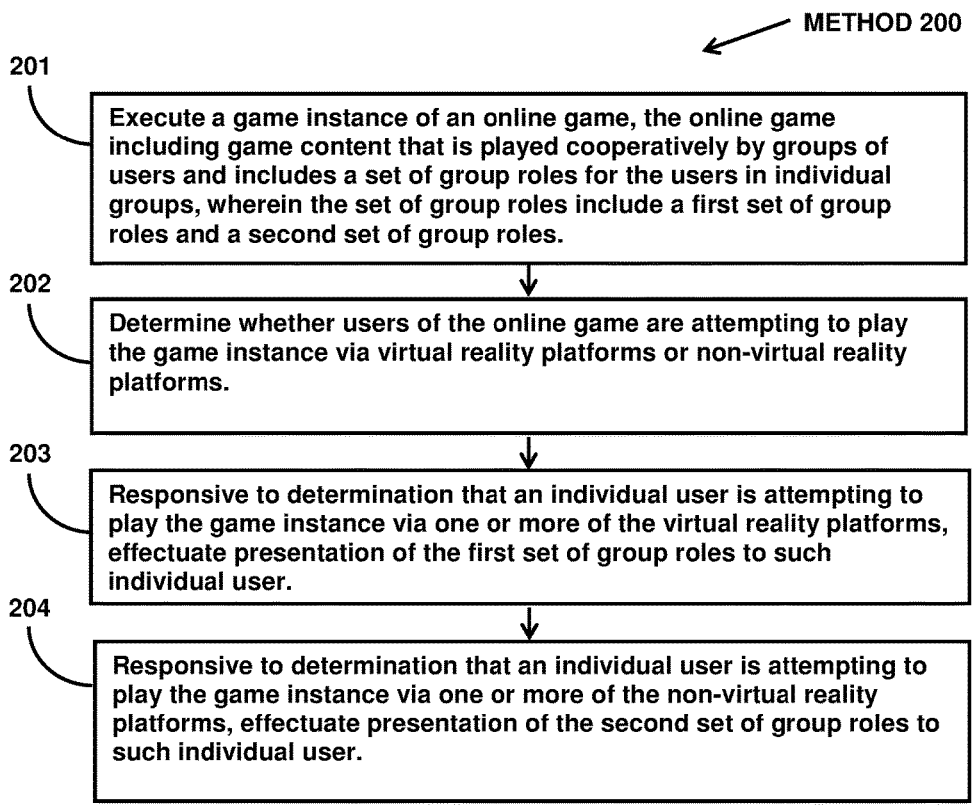
FIG. 2 illustrates a method for regulating access to game content of an online game.

FIG. 2 illustrates method 200 for regulating access to game content of an online game. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a game instance of an online game may be executed. The online game may include game content that is played cooperatively by groups of users. The game content may includes a set of group roles for the users in individual groups, wherein the set of group roles include a first set of group roles and a second set of group roles. The first set of group roles may differ from the second set of group roles. In some implementations, operation 201 may be performed by a processor component the same as or similar to game instance component 102 (shown in FIG. 1 and described herein).

At operation 202, whether users of the online game are attempting to play the game instance via virtual reality platforms or non-virtual reality platforms may be determined. In some implementations, operation 202 may be performed by a processor component the same as or similar to platform component 104 (shown in FIG. 1 and described herein).

At operation 203, responsive to determination that an individual user is attempting to play the game instance via one or more of the virtual reality platforms, presentation of the first set of group roles may be effectuated to such individual user. In some implementations, operation 203 may be performed by a processor component the same as or similar to VR roles component 106 (shown in FIG. 1 and described herein).

At operation 204, responsive to determination that an individual user is attempting to play the game instance via one or more of the non-virtual reality platforms, presentation of the second set of group roles may be effectuated to such individual user. In some implementations, operation 204 may be performed by a processor component the same as or similar to non-VR roles component 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that regulates access to game content of an online game, the system comprising:
one or more physical processors configured by machine readable instructions to:
execute a game instance of the online game and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the online game including the game content that is played cooperatively by groups of users and includes a group roles set for the users in individual groups, wherein the group roles set include a first set of group roles and a second set of group roles, the first set of group roles differing from the second set of group roles;
determine whether the users of the online game are attempting to play the game instance via the virtual reality platforms or the non-virtual reality platforms;
responsive to determination that an individual user is attempting to play the game instance via one or more of the virtual reality platforms, effectuate presentation of the first set of group roles to such individual user; and responsive to determination that an individual user is attempting to play the game instance via one or more of the non-virtual reality platforms, effectuate presentation of the second set of group roles to such individual user.

2. The system of claim 1, wherein the one or more physical processors are further configured by machine readable instruction to:

determine changes in the client computing platforms used by the users to interact with the online game;

responsive to determination that an individual user changed from playing the online game via the one or more of the virtual reality platforms to the one or more of the non-virtual reality platforms, effectuate presentation of the second set of group roles to such individual user; and responsive to determination that an individual user changed from playing the online game via the one or more of the non-virtual reality platforms to the one or more of the virtual reality platforms, effectuate presentation of the first set of group roles to such individual user.

3. The system of claim 1, wherein the first set of group roles is characterized by a first type of gameplay and the second set of group roles is characterized by a second type of gameplay, the first type of gameplay differing from the second type of gameplay.

4. The system of claim 1, wherein effectuating presentation of the first set of group roles includes:

receiving selection of a group role from the first set of group roles by the users attempting to play the game instance via one or more of the virtual reality platforms; and implementing the selected group roles for the users attempting to play the game instance via one or more of the virtual reality platforms.

5. The system of claim 1, wherein effectuating presentation of the first set of group roles includes:

selecting a group role from the first set of group roles for the users attempting to play the game instance via one or more of the virtual reality platforms; and implementing the selected group roles for the users attempting to play the game instance via one or more of the virtual reality platforms.

6. The system of claim 1, wherein effectuating presentation of the second set of group roles includes:

receiving selection of a group role from the second set of group roles by the users attempting to play the game instance via one or more of the non-virtual reality platforms; and implementing the selected group roles for the users attempting to play the game instance via one or more of the non-virtual reality platforms.

7. The system of claim 1, wherein effectuating presentation of the second set of group roles includes:

selecting a group role from the second set of group roles for the users attempting to play the game instance via one or more of the non-virtual reality platforms; and implementing the selected group roles for the users attempting to play the game instance via one or more of the non-virtual reality platforms.

8. The system of claim 1, wherein the virtual reality platforms include a virtual reality headset display.

9. The system of claim 8, wherein the virtual reality platforms include a motion controller.

10. The system of claim 8, wherein the virtual reality platforms include a haptic generator.

11. A method that regulates access to game content of an online game, the method comprising:

executing a game instance of the online game and using the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the online game including the game content that is played cooperatively by groups of users and includes a group roles set for the users in individual groups, wherein the group roles set include a first set of group roles and a second set of group roles, the first set of group roles differing from the second set of group roles;

determining whether the users of the online game are attempting to play the game instance via the virtual reality platforms or the non-virtual reality platforms;

responsive to determination that an individual user is attempting to play the game instance via one or more of the virtual reality platforms, effectuating presentation of the first set of group roles to such individual user; and responsive to determination that an individual user is attempting to play the game instance via one or more of the non-virtual reality platforms, effectuating presentation of the second set of group roles to such individual user.

12. The method of claim 10, wherein the one or more physical processors are further configured by machine readable instruction to:

determining changes in the client computing platforms used by the users to interact with the online game;

responsive to determination that an individual user changed from playing the online game via the one or more of the virtual reality platforms to the one or more of the non-virtual reality platforms, effectuating presentation of the second set of group roles to such individual user; and responsive to determination that an individual user changed from playing the online game via the one or more of the non-virtual reality platforms to the one or more of the virtual reality platforms, effectuating presentation of the first set of group roles to such individual user.

13. The method of claim 11, wherein the first set of group roles is characterized by a first type of gameplay and the second set of group roles is characterized by a second type of gameplay, the first type of gameplay differing from the second type of gameplay.

14. The method of claim 11, wherein effectuating presentation of the first set of group roles includes:

receiving selection of a group role from the first set of group roles by the users attempting to play the game instance via one or more of the virtual reality platforms; and implementing the selected group roles for the users attempting to play the game instance via one or more of the virtual reality platforms.

15. The method of claim 11, wherein effectuating presentation of the first set of group roles includes:

selecting a group role from the first set of group roles for the users attempting to play the game instance via one or more of the virtual reality platforms; and implementing the selected group roles for the users attempting to play the game instance via one or more of the virtual reality platforms.

16. The method of claim 11, wherein effectuating presentation of the second set of group roles includes:

receiving selection of a group role from the second set of group roles by the users attempting to play the game instance via one or more of the non-virtual reality platforms; and implementing the selected group roles for the users attempting to play the game instance via one or more of the non-virtual reality platforms.

17. The method of claim 11, wherein effectuating presentation of the second set of group roles includes:

selecting a group role from the second set of group roles for the users attempting to play the game instance via one or more of the non-virtual reality platforms; and implementing the selected group roles for the users attempting to play the game instance via one or more of the non-virtual reality platforms.

18. The method of claim 11, wherein the virtual reality platforms include a virtual reality headset display.

19. The method of claim 18, wherein the virtual reality platforms include a motion controller.

20. The method of claim 18, wherein the virtual reality platforms include a haptic generator.

* * * * *